(No Model.)

J. W. HEDGES.
SUBSOIL PLOW.

No. 542,889.   Patented July 16, 1895.

Witnesses.
Robert Everett.
Dennis Sumby.

Inventor.
John W. Hedges.
By James L. Norris.
Atty.

UNITED STATES PATENT OFFICE.

JOHN W. HEDGES, OF DANVILLE, KENTUCKY.

SUBSOIL-PLOW.

SPECIFICATION forming part of Letters Patent No. 542,889, dated July 16, 1895.

Application filed December 20, 1894. Serial No. 532,461. (No model.)

*To all whom it may concern:*

Be it known that I, JOHN W. HEDGES, a citizen of the United States, residing at Danville, in the county of Boyle and State of Kentucky, have invented new and useful Improvements in Subsoil-Plows, of which the following is a specification.

It is the object of my invention to provide a subsoil-plow of light draft, adjustable to any required depth of furrow and to right or left hand work, and of strong, durable, and comparatively inexpensive construction throughout.

The invention consists in the features of construction and combination of parts in a plow as hereinafter set forth and claimed.

Figure 1:
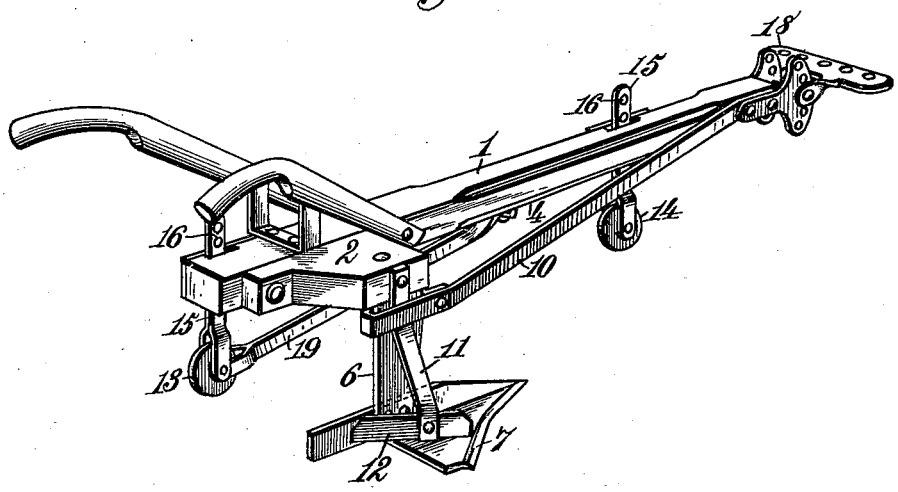
Figure 2:
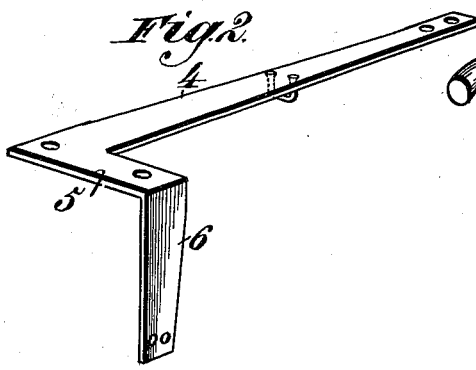
Figure 3:
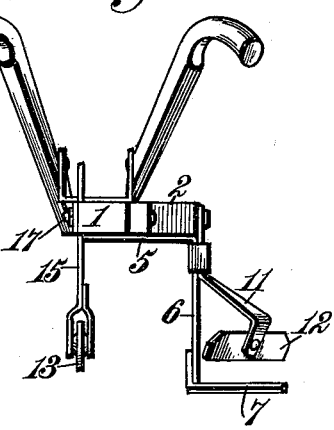
Figure 4:
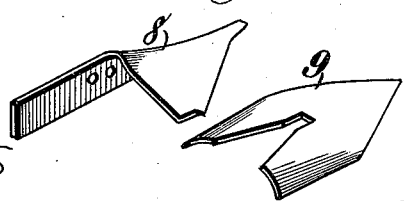

In the annexed drawings, illustrating the invention, Figure 1 is a perspective of my improved plow. Fig. 2 is a detached view of a bar that is secured to the under side of the plow-beam and provided with an offsetting arm having a depending standard for attachment of the share or point. Fig. 3 is a rear view of the plow. Fig. 4 is a view of different forms of plow shares or points detached.

The reference-numeral 1 designates a plow-beam having near its rear end an arm 2, projecting to one side. The usual handles 3 are secured to the beam near its rear end.

To the under side of the plow-beam 1 is securely fastened a metal bar 4, preferably of the same width as the beam and extended from its forward end to a point near the rear. At or near its rear end this bar 4 is provided with an offsetting arm 5, that corresponds very nearly with the beam-arm 2 and is extended laterally to its outer end. The metal bar 4 and its arm 5 are secured flatwise to and in close bearing-contact with the under side of the wooden plow-beam 1 and arm 2 and serve to brace and strengthen them and impart a great degree of stiffness to the implement. The outer end of the arm 5 is formed with a depending standard 6, to the lower end of which a plow share or point 7, of any suitable or required form, may be securely bolted. Points or shares 7, 8, and 9, of any desired form and either right or left hand, may be employed, according to the nature of the soil and the character of work to be done.

A brace 10 is extended from the forward end of the plow-beam to the upper end portion of the standard 6, around which it may be bent and strapped in such manner as to clamp onto the downward and outwardly bent shank 11 of a scraper 12, that is supported above and somewhat in rear of the plow point or share. The upper end of the scraper-shank 11 may be bolted or otherwise secured to the end of the arm 2 on the plow-beam. By means of the wing or scraper 12 behind the plowshare the dirt in the furrow will be leveled, so that in making the next furrow the horse will have a flat surface to walk on.

In order to support and steady the plow-beam a wheel 13 is connected with the rear end of the beam and another wheel 14 is connected with the beam near its forward end. These wheels are journaled in the lower ends of standards 15, each having a series of holes 16 for passage of a bolt 17 to adjustably secure the wheel-standard to the plow-beam at any desired height, according to the required depth of furrow. The depth of furrow will also be regulated by means of an adjustable clevis 18, attached to the forward end of the plow-beam. The rear or stationary portion of the clevis is provided on each side with vertical series of holes for passage of a bolt connecting at any required height with perforated arms on the forward or adjustable portion of the clevis, in which forward clevis part is a horizontal series of holes for laterally-adjustable connection of a doubletree at any desired point.

The vertically-adjustable standard of the rear wheel 13 may be braced or stayed by a brace 19, connecting with the bar 4 on the under side of the plow-beam.

The arrangement of the laterally-projecting arm, from which the standard 6 is supported at one side of the implement, causes the plow-beam to be set over onto the land and brings the plow share or point directly in rear of one of the draft-animals, thereby making a light draft. The wheel 13, connected with the rear end of the beam, supports the frame of the implement in such manner as to prevent it from falling to the landside, and the beam is further steadied by the wheel 14 near its forward end, while the depth of the furrow can be easily regulated by adjustment of the wheels and the clevis. The wing or scraper 12 is so arranged that it will level the soil loosened by the plow share or point, so that a smooth track will be afforded for the off horse when making the next furrow.

The construction of the implement is very simple, and the arrangement of its parts is such as will give it a light draft and render it especially adapted to subsoiling operations.

What I claim as my invention is—

1. The combination with the plow beam, of the bar secured to the under side of the beam, in close bearing contact therewith, and extended from the forward end of the beam to near its rear end and provided with an offsetting or laterally projecting arm having integral therewith a depending standard for attachment of a plow share or point, substantially as described.

2. The combination with a plow beam having the vertically adjustable wheels and a vertically adjustable clevis, of the bar secured to the under side of the plow beam and provided with an offsetting or laterally projecting arm formed with a depending standard, the plow share or point secured to said standard, and a scraper supported above and in rear of the point or share, substantially as described.

3. The combination of the plow beam having a laterally projecting arm near its rear end, the bar secured to the under side of the beam from its forward end to near the rear end of the beam and provided with a laterally projecting arm secured to and beneath the arm of the beam, a standard depending from the outer end of the arm on said beam, a plow point or share on said standard, the scraper, and the vertically adjustable wheels connected with the plow beam, substantially as described.

In testimony whereof I have hereunto set my hand and affixed my seal in presence of two subscribing witnesses.

JOHN W. HEDGES. [L. S.]

Witnesses:
 C. P. TERHUNE,
 THOS. DOUGLAS.